(12) United States Patent
Portet et al.

(10) Patent No.: US 9,971,306 B2
(45) Date of Patent: May 15, 2018

(54) COATING OF SURFACES INTENDED FOR HOROLOGY BY USING CATANIONIC COMPOSITIONS CONTAINING PHOSPHONIC MOLECULES AND AMINES

(71) Applicant: Association Suisse pour la Recherche Horlogere, Neuchatel (CH)

(72) Inventors: David Portet, Briollay (FR); Gregory Le Collinet, Juvardeil (FR)

(73) Assignee: Association Suisse pour la Recherche Horlogère, Neuchâtel (CH)

( * ) Notice: Subject to any disclaimer, the term of this patent is extended or adjusted under 35 U.S.C. 154(b) by 649 days.

(21) Appl. No.: 14/399,616

(22) PCT Filed: May 7, 2013

(86) PCT No.: PCT/EP2013/059538
§ 371 (c)(1),
(2) Date: Nov. 7, 2014

(87) PCT Pub. No.: WO2013/167624
PCT Pub. Date: Nov. 14, 2013

(65) Prior Publication Data
US 2015/0103639 A1 Apr. 16, 2015

(30) Foreign Application Priority Data
May 10, 2012 (FR) ..................... 12 54300

(51) Int. Cl.
*G04B 37/22* (2006.01)
*B05D 1/18* (2006.01)
(Continued)

(52) U.S. Cl.
CPC ............. *G04B 37/22* (2013.01); *B05D 1/185* (2013.01); *B05D 1/34* (2013.01); *B05D 3/002* (2013.01);
(Continued)

(58) Field of Classification Search
None
See application file for complete search history.

(56) References Cited

U.S. PATENT DOCUMENTS 4,308,079 A 12/1981 Venables et al.
2004/0253181 A1 12/2004 Port et al.
(Continued)

FOREIGN PATENT DOCUMENTS

FR 2 848 850 A1 6/2004
FR 2 878 248 A1 5/2006
(Continued)

OTHER PUBLICATIONS

International Search Report dated Sep. 9, 2013, in PCT/EP2013/059538, filed May 7, 2013.
(Continued)

*Primary Examiner* — Nathan T Leong
(74) *Attorney, Agent, or Firm* — Oblon, McClelland, Maier & Neustadt, L.L.P.

(57) ABSTRACT

The present invention describes the use of amine molecules (N) and phosphonic compounds (P) for coating surfaces intended to be used in the field of horology. Since these two types of compounds are alkaline and acid in nature, they form pairs of ions that interact with all types of surfaces, whether these are composed of mineral materials such as glass, metal, non-oxidized materials (inter alia gold, rhodium and their alloys), or also polymeric materials. Taking advantage of the surprising complementary nature of these two types of compounds, the present inventors propose a composition and a coating process that enable functionalization layers to be formed on any type of material, in particular those used in clock mechanisms.

23 Claims, 4 Drawing Sheets

Figure 1:
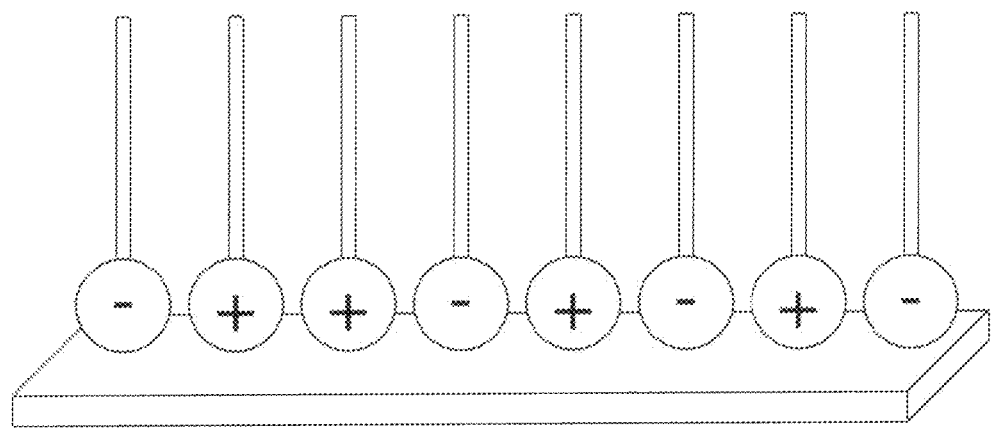

(51) Int. Cl.
  *B05D 1/34* (2006.01)
  *B82Y 30/00* (2011.01)
  *B82Y 40/00* (2011.01)
  *B05D 3/00* (2006.01)
  *B05D 7/00* (2006.01)
  *C10M 177/00* (2006.01)
  *C10M 105/62* (2006.01)
  *C10M 105/74* (2006.01)
  *B05D 7/14* (2006.01)

(52) U.S. Cl.
  CPC .............. *B05D 3/007* (2013.01); *B05D 7/52* (2013.01); *B82Y 30/00* (2013.01); *B82Y 40/00* (2013.01); *C10M 105/62* (2013.01); *C10M 105/74* (2013.01); *C10M 177/00* (2013.01); *B05D 7/14* (2013.01); *C10M 2223/06* (2013.01); *C10M 2223/063* (2013.01); *C10N 2230/06* (2013.01); *C10N 2240/06* (2013.01); *C10N 2250/121* (2013.01); *C10N 2280/00* (2013.01)

(56) References Cited

U.S. PATENT DOCUMENTS

2008/0160313 A1  7/2008  Lopez et al.
2008/0220037 A1  9/2008  Denizot et al.
2010/0297025 A1  11/2010  Port et al.

FOREIGN PATENT DOCUMENTS

FR      2 904 784 A1    2/2008
WO     WO2008017721  *  2/2008

OTHER PUBLICATIONS

Ryan D. Ross, et al., "Binding affinity of surface functionalized gold nanoparticles to hydroxyapatite", Journal of Biomedical Materials Research A, vol. 99A, Issue 1, XP 055059995, Oct. 2011, pp. 58-66.

* cited by examiner

COATING OF SURFACES INTENDED FOR HOROLOGY BY USING CATANIONIC COMPOSITIONS CONTAINING PHOSPHONIC MOLECULES AND AMINES

This is a National Phase Application in the United States of International Patent Application PCT/EP2013/059538 filed May 7, 2013 which claims priority on French patent Application No. FR 1254300 filed May 10, 2012. The entire disclosures of the above patent applications are hereby incorporated by reference.

DESCRIPTION OF THE PRIOR ART

As described in patent FR 245742, surfaces, in particular metal surfaces, that are regularly or occasionally in contact with fingers or contaminants, e.g. bottles and/or their stoppers, ballpoint pens, belt buckles, items of jewelry, watches (watchbands, cases, glasses), metallised spectacle glasses or also components used in microtechnology and microelectronics, are likely to be subject to various kinds of contamination. The handling of these objects, the products that they contain or contact with the ambient air can, in some circumstances, cause dirt deposits and/or microbiological contamination (fungi, bacteria, viruses etc.), and this can be problematic when the contents of the bottle (creme, oil, perfume, medication etc.) are applied to the skin or ingested by the user. Moreover, the presence of these unsightly marks can also be problematic for the sale of these objects.

Fingerprints are the cause of a good number of these marks. The substances responsible for these prints (fatty or aqueous substances) can either come from external contamination (dirt transfer) or be secreted from the skin (e.g. by sweat, which is a mixed aqueous and lipidic composition).

Dirt deposits (finger marks, contamination marks etc.) can be cleaned off using a cleaning agent (detergents, towelettes, soaps etc.), but such an operation is temporary and must be repeated often.

A good method of combating the deposit of such contaminants efficiently in the long term would be to treat the surfaces to render them non-stick, i.e. hydrophobic and lipophobic. This permanent treatment would in fact prevent oily compounds (fats, sweat, wax etc.) or aqueous compounds (water, sweat, dew, bacterial suspension etc.) from being deposited onto the surfaces and prevent microorganisms in suspension therein from being able to attach thereto.

Moreover, it is important in micromechanical applications (such as horological applications) to be able to benefit from hydrophobic and oleophobic surfaces to promote lubrication, limit wear of the parts and prevent lubricants from spreading. Numerous different materials are present in these mechanisms.

Surface coatings have already been described for limiting this contamination and/or the deposition of dirt, in particular coatings based on organic compounds containing a carboxylic acid or a phosphonic acid (WO 2007/112312), or based on organophosphorus acid (EP 1955638). Others are described to promote lubrication and limit the spread of oils in horology.

However, these techniques of the prior art have not proved to be completely satisfactory in that they do not allow all metal surfaces (in particular, gold, silver and rhodium in the case of horology) to be treated effectively.

There are two types of molecules that are capable of forming monolayers on gold surfaces: thiol molecules, on the one hand, and amino molecules on the other. The former exhibit higher adhesive strengths to gold than the latter. In fact, amino (N) molecules with the general formula R—NH—R' are known for the formation of self-assembled layers on colloidal gold particles (Ross et al., J. Biomed. Mater. Res. 2011; Aslam et al., J. Mater. Chem. 2004) or on gold surfaces (Yoshimoto et al., Langmuir 2009) with quite low bond energies.

Moreover, it is known that phosphonic compounds, in particular bisphosphonic compounds carrying a perfluorinated (PF) or perfluoropolyether (PFPE) group, modify wettability properties and render the surfaces that they coat hydrophobic and lipophobic (FR 2904784 and EP 2054165). These compounds are capable of attaching in the form of self-assembling monolayers to mineral materials, or metal materials such as iron, titanium, copper, aluminium, nickel, tin or to alloy metals (e.g. steel, stainless steel, brass, copper-nickel-zinc, bronze, tin-nickel, nickel-phosphorus, copper-beryllium). On the other hand, these molecules only have a very limited affinity to materials in reduced oxidation state or low oxidised state such as certain polymers and certain noble metals (gold, silver, rhodium etc.).

In this context, the present inventors have sought to identify a method of surface functionalisation that enables the hydrophobic and lipophobic nature of surfaces formed from any type of material to be increased in the long term, in order to
  (i) reduce the corrosion and/or deposit of dirt on these surfaces effectively in the long term,
  (ii) reduce the energy of the treated surface in order to reduce the affinity of liquids to this surface in order to
    a. limit the spread of aqueous or oily liquids
    b. promote their flow on these surfaces,
  (iii) promote lubrication and/or
  (iv) limit the wear of mechanical parts.

The reduction of surface energy caused by the deposition of a hydrophobic and lipophobic coating is also sought in the demoulding of parts (polymer, composite, thermoset, thermoplastic parts etc.) This functionalisation layer must therefore be resistant to high temperatures, since the object may possibly be subjected to a treatment at high temperature and/or to multiple washing operations.

LEGEND OF THE DRAWINGS

Figure 2A:
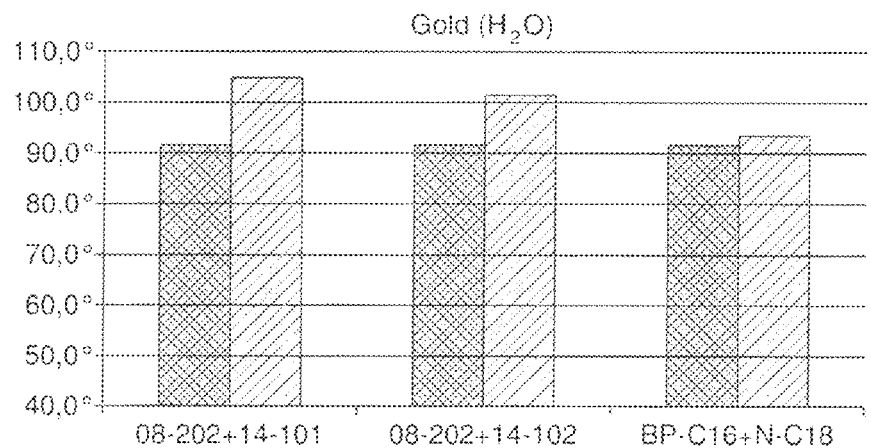
Figure 2B:
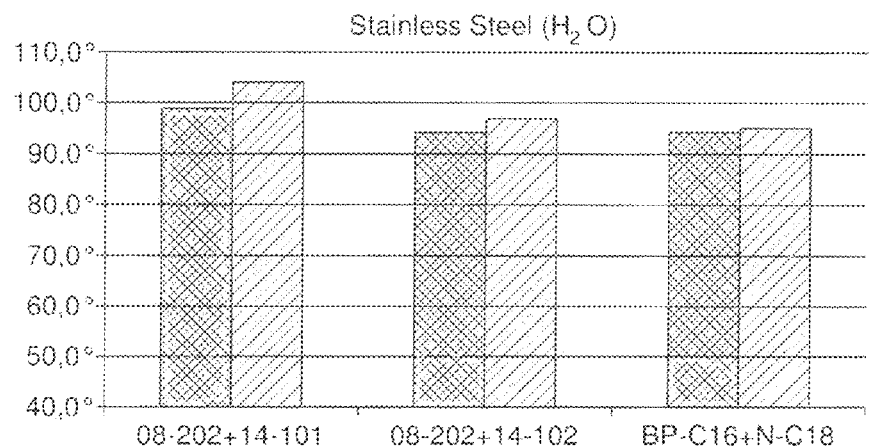
Figure 2C:
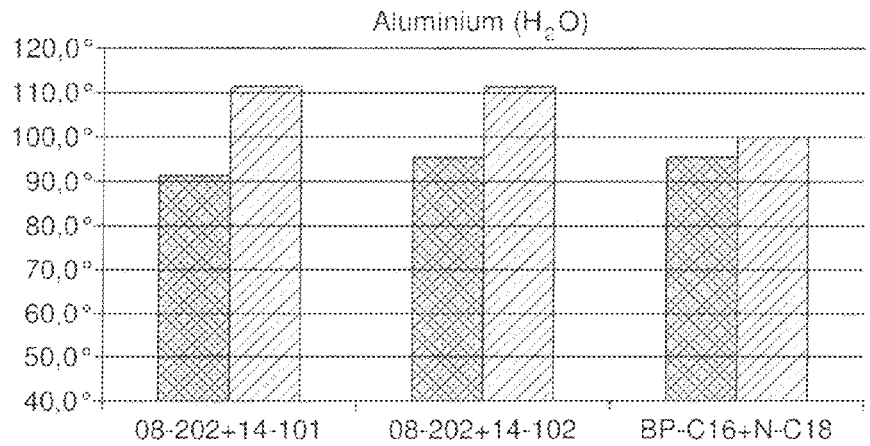
Figure 3A:
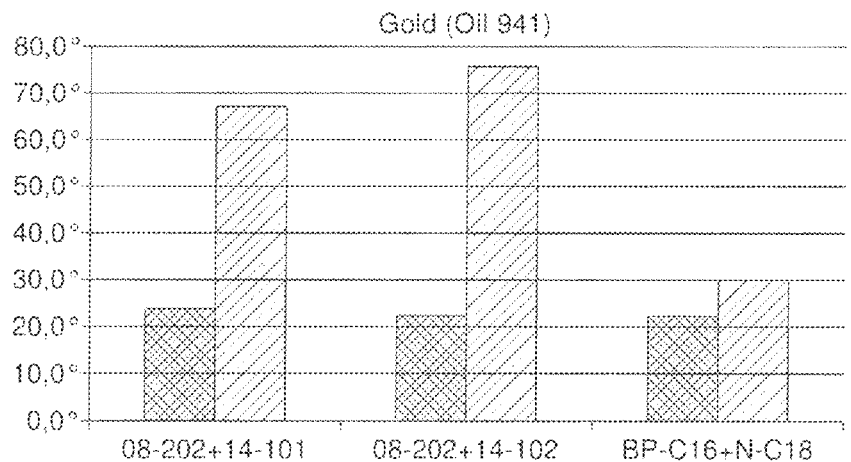
Figure 3B:
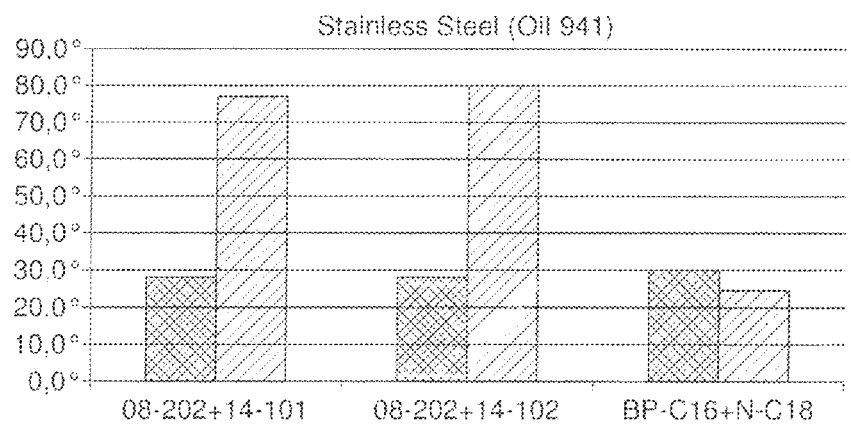
Figure 3C:
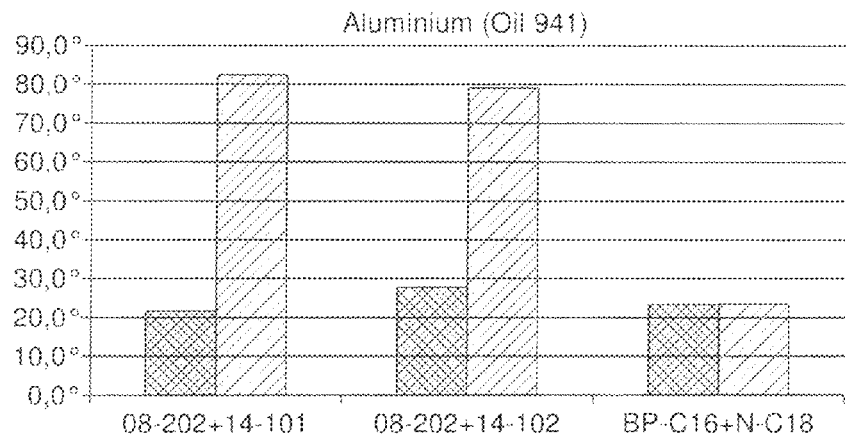
Figure 4:
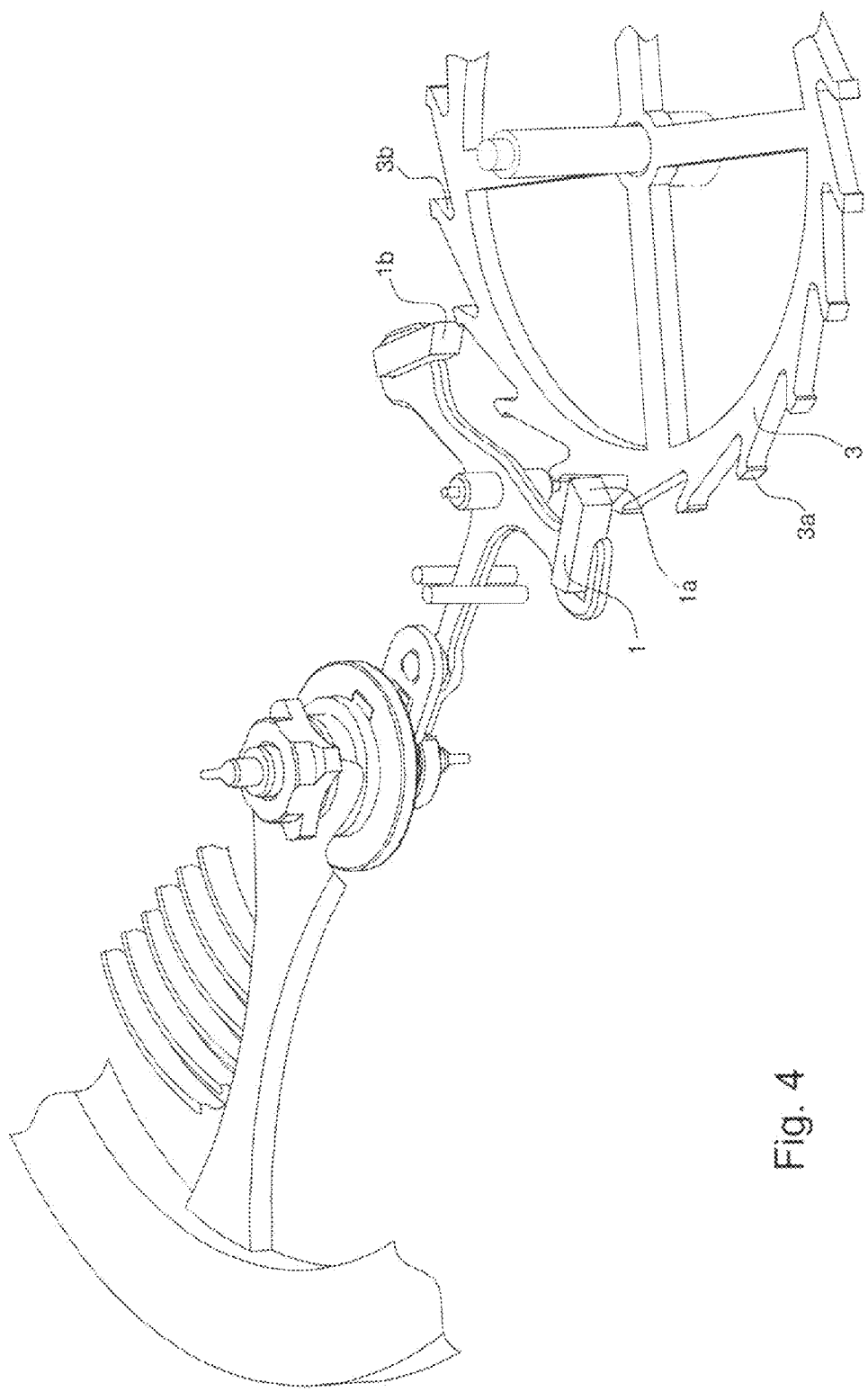

FIG. 1 schematically shows an alternating sequence of negatively charged molecules and positively charged molecules deposited on a solid surface;

FIG. 2 shows the contact angles of water droplets placed on substrates (A=gold, B=stainless steel, C=aluminium) as a function of the type of coating used (non-coated substrate=in dark grey as opposed to coated substrate of a composition containing molecules 08-202 and 14-101, molecules 08-202 and 14-102 or molecules BP-C16 and N-C18=in light grey);

FIG. 3 shows the contact angles of droplets of Moebius 941 oil placed on substrates (A=gold, B=stainless steel, C=aluminium) as a function of the type of coating used (non-coated substrate=in dark grey as opposed to coated substrate of a composition containing molecules 08-202 and 14-101, molecules 08-202 and 14-102 or molecules BP-C16 and N-C18=in light grey);

FIG. 4 shows a Swiss lever escapement, in which successive contacts are made between the pallet stones of the pallets (1) and the teeth of the escapement wheel (3). The friction must be minimised on the entry pallet stone (1a) and on the exit pallet stone (1b), an optimum lubrication must be assured along the contact in the resting plane (3b) and in the impulse plane (3a) of the tooth.

DETAILED DESCRIPTION OF THE INVENTION

In this context, the inventors have discovered that amino molecules and phosphonic molecules form pairs of ions that are capable of attaching and/or self-assembling in the long term on any type of surface, whether they are made from metal, mineral or polymer. In the form of amine (N) and phosphonic acid (P) or ammonium (N$^+$) and phosphonate (P$^-$), these molecules are organised alternately combining one or more positive charges (N$^+$) close to one or more negative charges (P$^-$). Since these molecules additionally have the possibility of self-assembling and self-organising, the result obtained is a self-assembled monolayer such as that shown in FIG. 1. The surfaces treated by a mixture of these two types of molecules are functionalised on a long term basis. The mixture can be formed in solution before deposition or directly on the surface to be treated by successive deposition of the two compounds.

Surprisingly, it is possible to use such a mixture to effectively coat surfaces, on which neither amino molecules nor phosphonic molecules can attach for the long term when they are alone (cf. Example 2). It is likely that the chemical organisation of two molecules such as those shown in FIG. 1 is the cause for this surprising property, since the interaction between the two molecules would be such that it would provide a weak affinity with the surface to be coated. The invention therefore advantageously allows any type of surface to be functionalised more rapidly and in a more resistant manner than the solutions already known from the prior art.

Catanionic compositions for reducing the surface tension at the liquid-gas interface have already been described (cf. in particular U.S. Pat. No. 7,097,705), but none has been described for modifying the properties of solid surfaces. The present inventors have discovered that the combination of i) two chemical groups capable of forming pairs of catanionic ions and also capable of interacting with surfaces with ii) chemical groups that enable self-organisation as well as lateral cohesion (once self-assembled) enables any type of solid material to be coated on a long term basis by catanionic self-assembled layers.

Hence, a composition comprising amine compounds in mixture with phosphonic compounds or the sequential application of two compositions, each containing one of these compounds, allows a large number of mineral surfaces and metal surfaces to be coated, including gold, silver, iron, rhodium, titanium, copper, aluminium, nickel, tin, or alloy metals such as steel, stainless steel, brass, copper-nickel-zinc, bronze, tin-nickel, nickel-phosphorus, copper-beryllium, or also ceramics, polymers or glass, and, very effectively and for the long term, reduce the corrosion on these surfaces as well as dirt deposition and microbiological contamination of these.

When the amine or phosphonic compounds carry perfluoropolyether (PTPE) groups, the monolayers formed by such a composition/application give these surfaces a hydrophobic and oleophobic character, which limits the attachment and promotes the flow of droplets of water, sweat and/or of fatty materials and thus prolonged contact with the microorganisms that they contain. Such a coating also allows the surface energy of these surfaces to be reduced and gives these surfaces anti-adhesive and/or lubricating properties.

In particular, the layers formed can be deposited in a determined zone of a surface to confine a lubricant in said zone, wherein said surface is intended to be used in a clock mechanism or in a device integrated into a watch product.

In a first aspect, therefore, the invention relates to a composition comprising at least one amine compound and at least one phosphonic compound or one of their toxicologically acceptable salts.

"Amine compound" is understood here to mean an organic compound derived from ammonia, in which certain hydrogens have been replaced by a group containing carbon. Primary, secondary or tertiary amine are terms used depending on whether one, two or three hydrogens have been substituted. The additional alkylation of these compounds also allows ammonium salts to be included in the definition. Amines are generally obtained by the alkylation of amines of inferior rank. By alkylating ammonia primary amines are obtained that can be alkylated to form secondary amines and then tertiary amines. The alkylation of the latter allows quaternary ammonium salts to be obtained. Other methods exist, all of which are also classic and well known to the person skilled in the art. One of these is outlined in Example 1 below.

"Phosphonic compound", "phosphonic molecule" or "phosphonic acid" or "phosphonate" are understood here to mean a compound containing at least one PO$_3$ group in its phosphonate form, PO$_3$, or in its phosphonic acid form, PO$_3$H. Such compounds are described in particular in EP 2 054 165.

The "toxicologically acceptable salts" concerned in the present invention are, in particular, sodium or potassium salts, calcium or magnesium salts, or salts formed by appropriate organic ligands such as ammonium salts. The salts are therefore preferably selected from sodium, potassium, magnesium, calcium and ammonium salts.

In a particular embodiment the composition of the invention contains an amine compound of the following formula (I-N):

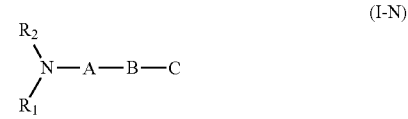

(I-N)

in which:
A is a (CH$_2$)$_m$—X— group, wherein m is an integer in the range of between 0 and 100, preferably in the range of between 0 and 30, and X is a C$_0$-C$_{100}$ alkyl group that is saturated or not, perfluorinated or partially fluorinated, wherein the alkyl chain can be substituted or interrupted by 0 to 10 cycloalkyl or aryl groups that can be perfluorinated or not; X can also be a single covalent bond, a —(O—CH$_2$—CH$_2$)$_{m'}$, —(O—CH$_2$—CH2-CH$_2$)$_{m'}$, —(O—CH$_2$—CH(CH$_3$))$_{m'}$, —(O—CH(CH$_3$)—CH$_2$)$_{m'}$ group, wherein m' is an integer in the range of between 0 and 100, preferably in the range of between 0 and 50, B is
 a) a single chemical bond or an O or S atom or an S(CO), (CO)S or NR, (CO)NR, NR(CO) group, wherein R is a hydrogen atom or a C$_1$-C$_{10}$ alkyl, or b) 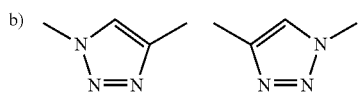

C is selected from: a hydrogen atom, F(CF(CF$_3$)CF$_2$O)$_n$(CF$_2$)$_2$CF$_3$, F(CF$_2$CF(CF$_3$)O)$_n$(CF$_2$)$_2$CF$_3$, F(CF$_2$CF$_2$CF$_2$O)$_n$(CF$_2$)$_2$CF$_3$, and F(CF$_2$CF$_2$O)$_n$(CF$_2$)$_2$CF$_3$ and C$_p$F$_{2p+1}$, in which n and p are integers in the range of between 1 and 100, preferably between 1 and 50, and R$_1$ and R$_2$ independently represent A-B-C groups as defined above or a hydrogen atom or a linear short-chain C$_1$-C$_6$ alkyl.

In another particular embodiment the composition of the invention contains a phosphonic compound of the following formula (I-P):

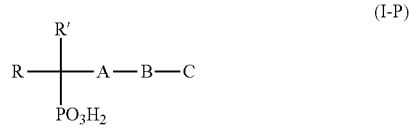

(I-P)

in which
R is a hydrogen atom H, fluorine atom F or an OH group,
R' is a hydrogen atom H, fluorine atom F or a PO$_3$H$_2$ group
A is a (CH$_2$)$_m$—X— group, wherein m is an integer in the range of between 0 and 100, preferably in the range of between 0 and 30, and X is a C$_0$-C$_{100}$ alkyl group that is saturated or not, perfluorinated or partially fluorinated, wherein the alkyl chain can be substituted or interrupted by 0 to 10 cycloalkyl or aryl groups that can be perfluorinated or not; X can also be a single covalent bond, a —O—CH$_2$—CH$_2$)$_{m'}$, —(O—CH$_2$—CH2-CH$_2$)$_{m'}$, —(O—CH$_2$—CH(CH$_3$))$_{m'}$, —(O—CH(CH$_3$)—CH$_2$)$_{m'}$ group, wherein m' is an integer in the range of between 0 and 100, preferably in the range of between 0 and 50,
B is
a) a single chemical bond or an O or S atom or an S(CO), (CO)S or NZ, (CO)NZ, NZ(CO) group, wherein Z is a hydrogen atom or a C$_1$-C$_{10}$ alkyl, or

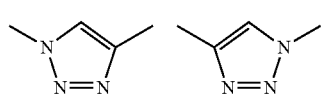

b)

and
C is selected from: a hydrogen atom, (CF(CF$_3$)CF$_2$O)$_n$(CF$_2$)$_2$CF$_3$, (CF$_2$CF(CF$_3$)O)$_n$(CF$_2$)$_2$CF$_3$, (CF$_2$CF$_2$CF$_2$O)$_n$(CF$_2$)$_2$CF$_3$, (CF$_2$CF$_2$O)$_n$(CF$_2$)CF$_3$ and C$_p$F$_{2p+1}$—, in which n and p are integers in the range of between 1 and 100, preferably between 1 and 50.

In the formulae described in the present application the letter "S" denotes a sulphur atom, the letter "O" an oxygen atom, the letter "N" a nitrogen atom, the letter "F" a fluorine atom, the letter "H" a hydrogen atom, the letter "C" a carbon atom and the letter "P" a phosphorus atom, in accordance with the classically used nomenclature (as a general rule, the terms used for all groups and atoms usable in the compounds described here are understood to be consistent with their usual interpretation in the art).

In the sense of the present invention "C$_0$-C$_{100}$ alkyl" group is understood to mean a preferably saturated, linear or branched divalent hydrocarbon chain comprising 0 to 100, preferably 0 to 30, even more preferred 0 to 20 carbon atoms. The methylene, ethylene, propylene, isopropylene, butylene, isobutylene, sec-butylene, pentylene or also hexylene groups can be mentioned as examples. A linear alkyl is, for example, a methyl, ethyl, propyl, butyl, pentyl, hexyl etc. group.

"Perfluorinated" is understood to denote a substituted alkyl, cycloalkyl, aryl group wherein the hydrogen atoms have been substituted by fluorine atoms, e.g. C$_n$F$_{2n}$, wherein n is preferably in the range of between 0 and 50, more preferred in the range of between 0 and 10.

"Partially fluorinated" is understood to denote a molecule, in which one or more hydrogen atoms is (are) substituted by fluorine atoms.

In the present invention "cycloalkyl" group is understood to mean a cyclic saturated hydrocarbon chain preferably comprising between 3 and 7 cyclic carbon atoms. Cyclopropyl, cyclobutyl, cyclopentyl, cyclohexyl and cycloheptyl groups can be mentioned as examples.

In the present invention "aryl" is understood to mean an aromatic group preferably comprising 6 to 10 carbon atoms and comprising one or more attached rings such as a phenyl or naphthyl group, for example. This is advantageously phenyl.

According to a preferred embodiment of the invention the phosphonic and amine compounds carry fluorinated groups that give the treated materials oleophobic and hydrophobic properties. This functionality allows flows to be promoted, adhesive strengths to be limited, and corrosion to be prevented, lubrication, and the deposition of dirt, fouling and/or microbiological contamination to be limited on these materials. This treatment additionally provides a good mechanical strength as well as an ageing resistance and resistance to cleaning products.

In this preferred embodiment the phosphonic compounds present in the composition of the invention preferably carry a perfluorinated (PF) or perfluoropolyether (PFPE) group. It is even more preferred if these are bisphosphonic compounds such as those described in patent application nos. FR2904784 and EP 2 054 165.

More specifically, said amine compound can be a perfluorinated amine or a perfluoropolyether amine of the following formula I'-N:

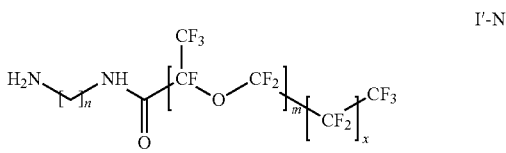

I'-N in which n is an integer in the range of between 1 and 100, m is an integer in the range of between 0 and 100 and x is an integer in the range of between 0 and 10, and said phosphonic compound can be a perfluorinated bisphosphonic acid or carry at least one perfluoropolyether group of the following formula I'-P:

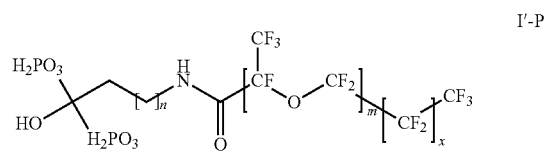

I'-P in which n is an integer in the range of between 1 and 100, m is an integer in the range of between 0 and 100 and x is an integer in the range of between 0 and 10.

It is preferred if in formulae I'-N and I'-P n is an integer in the range of between 1 and 30, m is an integer in the range of between 0 and 50 and x is an integer in the range of between 0 and 10.

It is further preferred if in formulae I'-N and I'-P n is an integer in the range of between 1 and 20, m is an integer in the range of between 0 and 30 and x is an integer in the range of between 0 and 10.

It is particularly preferred if said perfluorinated amine is a compound of formula I'-N, in which n=6, m=4 and x=1, or n=2, m=4 and x=1, or n=6, m=5 and x=1, or n=2, m=5 and x=1, and said perfluorinated phosphonic compound is a compound of formula I'-P, in which n=4, m=4 and x=1, or also n=4, m=5 and x=1.

In addition, the composition of the invention can advantageously contain an amine compound that is a linear alkyl amine of the following formula I"-N:

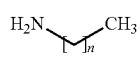

I"-N in which n is an integer in the range of between 1 and 100, preferably between 5 and 30, and even more preferred between 8 and 20.

The composition of the invention can also advantageously contain a phosphonic compound of the following formulae I"-P and I"'-P:

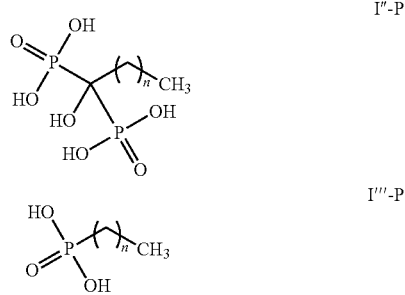

in which n is an integer in the range of between 1 and 100, preferably between 5 and 30 and even more preferred between 8 and 20.

The compositions containing a compound of the formula (I-N), (I'-N) and/or (I"-N) and (I-P), (I'-P), (I"-P) and/or (I"'-P) can be advantageously used to reduce the surface energy of the surfaces treated. As described in patent applications FR 2904784 and EP 2054165, the use of layers of low surface energy is widespread in the field of lubrication of mechanical parts. This concept of lubrication in reality covers a very large number of physical phenomena such as adhesion of surfaces (as a result of the surface roughness, but also surface energies of the materials involved), sliding on surface layers, or "surfing" on more or less viscous liquid ("hydrodynamic" lubrication). As part of the lubrication of metal parts it is desirable to have very strongly secured layers that result in surfaces of low surface energy. Consequently, the use of a mixture of amine and phosphonic molecules exhibiting both a strong bond with the support material and a perfluorinated or perfluoropolyether group allows a dry lubrication of these materials.

The compositions of the invention containing amine and phosphonic compounds preferably of the formula (I-N), (I'-N) and/or (I"-N) and (I-P), (I'-P), (I"-P) and/or (I"'-P), or one of their salts enable in particular the corrosion of the surfaces that they cover to be limited and the deposition of dirt and/or microbiological contamination thereof to be reduced.

The present invention therefore describes compositions comprising an effective quantity of amine and phosphonic compounds preferably of the formula (I-N), (I'-N) and/or (I"-N) and (I-P), (I'-P), (I"-P) and/or (I"'-P), or their toxicologically acceptable salts that are capable of attaching for the long term to mineral or metal surfaces intended for bottle production or for coating of any object potentially in contact with fingers, the air or any liquid, and capable of increasing the oleophobicity and/or hydrophobicity thereof and therefore capable of limiting the deposit of fungal growths, dirt and therefore the microbiological contamination on this surfaces. More particularly, the composition of the invention allows a contact angle between an oil and the coated surface of at least 45°, preferably 60°, and an angle between water and the coated surface of at least 90° to be obtained.

The term "effective quantity" is understood to mean that the quantity of compound applied allows a thin film to be formed after coating that enables the aforementioned angles to be obtained.

The compositions of the invention can be liquid, gaseous or supercritical. They are preferably liquid. In this case, the compositions of the invention can be aqueous and/or organic compositions.

The solvent of the liquid composition of the invention is chosen so as to enable solubilisation of the two types of compounds present in the composition. This solvent could be chosen in particular from water or also alcohol solvents, in particular $C_1$ to $C_6$ alcohols such as methanol, ethanol, isopropanol (IPA), aldehydes, ketones such as acetone, ethers such as diethyl ether or tetrahydrofuran, or alkanes, in particular $C_1$ to $C_8$ alkanes, as well as their mixtures, or also in a solvent composed of hydrotreated naphthas in mixture with IPA or acetone, for example. The mixtures can also be composed of one or more of the aforementioned solvents and water ($H_2O$). The solvent of the composition of the invention is preferably water in mixture with IPA or IPA on its own. It is possible to use water/IPA solvents in any proportion, e.g. 50% water and 50% IPA or 90% water and 10% IPA.

The composition of the invention can also be gaseous, wherein in particular the phosphine and amine compounds can be in vapour state.

"Supercritical composition" is understood to mean a composition that is in a supercritical fluid state. Numerous supercritical fluids are known. $CO_2$ is preferred here.

The composition of the invention is advantageously present in the form of a solution, suspension, emulsion, a supercritical fluid, an aerosol, a gel or a foam.

The content of phosphonic compounds in the liquid composition of the invention is advantageously in the range of between 0.0001 and 20% by weight, preferably between 0.001 and 5% by weight of the total composition, and the content of amine compounds in the liquid composition of the invention is advantageously in the range of between 0.0001 and 20% by weight, preferably between 0.001 and 5% by weight of the total composition.

According to an embodiment the N and P compounds are integrated into the composition of the invention in a molar concentration in the range of between $10^{-1}$ and $10^{-15}$ mol/L of each compound, preferably in the range of between $10^{-2}$ and $10^{-5}$ mol/L.

The two compounds are preferably present in the composition of the invention in equal quantities (i.e. 50%-50% within the composition), although it is also possible to use different proportions (25%-75% of one or the other).

The present invention also concerns the use of these compositions to increase the hydrophobicity and oleophobicity of a surface, the use of these compositions to limit the corrosion of a surface and the use of these compositions to limit dirt deposition and/or the microbiological contamination on a surface. Said surface is preferably made of metal, mineral or organic material. In particular, it can be made of glass or polymer.

In another aspect these compositions can also be used to reduce the surface energy of the treated surfaces and therefore to lubricate metal parts by reducing their coefficient of friction and limiting their mechanical wear.

The surfaces treated with the compositions of the invention can be intended for use in the field of horology, e.g. in the case of parts or devices used in watches, alarm clocks or clocks.

In a second aspect the present invention concerns a process for coating a surface with a molecular functionalisation layer, characterised in that it comprises at least the following steps:
  a) optionally preparing said surface by washing in a solvent, then drying,
  b) placing said surface in contact with a composition containing phosphonic compounds,
  c) placing said surface in contact with a composition containing amine compounds,
  d) removing the supernatant,
  e) rinsing the functionalised surface,
  f) drying the functionalised surface.

More specifically, the coating process of the invention comprises at least the following steps:
  a) optionally preparing said surface by washing in a solvent, then drying,
  b) placing said surface in contact with a composition containing an effective quantity of phosphonic compounds until self-assembly of said phosphonic compounds to a fine layer on said surface,
  c) placing said surface in contact with a composition containing an effective quantity of amine compounds until self-assembly of said amine compounds to a fine layer on said surface,
  d) removing the supernatant,
  e) rinsing the functionalised surface,
  f) drying the functionalised surface.

The amine compounds that may be used in the process of the invention are those described above, in particular compounds of formula I-N, I'-N and I"-N.

The phosphonic compounds that may be used in the process of the invention are those described above, in particular compounds of formula I-P, I'-P, I"-P and I'"-P.

Said amine compounds and said phosphonic compounds are preferably different compounds. In other words, the compounds used in steps b) and c) are not identical, although it is possible that the phosphonic compounds contain an amine group and vice versa.

The amine compounds and the phosphonic compounds of the invention preferably coat the surface directly after the process of the invention has been conducted. "Coat directly" is understood to mean that these compounds are complexed with the surface—or fixed to the surface—without any intermediate. The two types of compounds are therefore directly in contact with the surface to be coated (cf. FIG. 1).

Said surface is preferably a surface formed to more than 50%, preferably to more than 75%, even more preferred to 85%, indeed even to more than 95%:
  of metals and oxides chosen from gold (Au), platinum (Pt), palladium (Pd), silver (Ag), rhodium (Rh), copper (Cu), iron (Fe), titanium (Ti), aluminium (Al), chromium (Cr), tantalum (Ta), aluminas, zirconias, ruby (alloy of aluminium oxide and chromium, n° CAS 12174-49-1), sapphire (aluminium oxide, n° CAS 1317-82-4), nickel (Ni), ruthenium (Ru) and tin (Sn),
  alloys and oxides chosen from steels (alloy of iron and carbon), stainless steel, brass (alloy of copper and zinc), copper-nickel-zinc (alloy), bronze (alloy of copper and tin), tin-nickel (Sn—Ni), nickel-phosphorus (Ni—P), copper-beryllium (Cu—Be), palladium-nickel (Pd—Ni), copper-cobalt (Cu—Co) or alloys containing vanadium (V), chromium (Cr), manganese (Mn), zinc (Zn), tungsten (W), or zirconium (Zr), or an amorphous alloy, or ceramics such as e.g. zirconium oxides (ZrOx), titanium oxide (TiOx) or tantalum oxide (TaxOy),
  semi-conductors such as silicon (Si) or germanium (Ge) as well as their oxides such as glass (SiOx), or also diamond in any one of its forms,
  carbide and nitride chosen from the following materials: boron (B), silicon (Si), tungsten (W), chromium (Cr), titanium (Ti), magnesium (Mg), aluminium (Al),
  substituted or unsubstituted polymers such as e.g. polyamides, polyacrylates, polyacrylamides, polyurethanes, polyureas, polyesters, polyketones, polyimides, polysulphides, polysulphoxides, polysulphones, polythiophenes, polypyridines, polypyrroles, polyethers, silicones, polyamides, polysaccharides, fluoropolymers, amides, imides, polypeptides, polyethylenes, polyoxymethylene (POM), polystyrenes, polypropylenes, polyethylene terephthalates (PET), polyether ether ketones (PEEK), nylons, copolymers of any of these polymers or mixtures thereof.

In a preferred embodiment said surface is formed to more than 50%, preferably to more than 75% and even more preferred to more than 85%, indeed even to more than 95% of gold, steel, stainless steel, titanium, nickel, glass, rhodium or aluminium.

In an embodiment this surface is magnetic. This is the case in particular with surfaces made from a material containing iron. However, in another embodiment the surface is not magnetic. This is in particular the case with surfaces made from a material such as ceramic or glass, or also non-magnetic metal alloys. In a particular embodiment the surface is not a magnetic particle.? In particular, the surface is preferably not a magnetic particle formed completely or partly by a derivative of iron, in particular iron (III), as an iron oxide or hydroxide. The surface is preferably not a magnetic particle with a hydrodynamic diameter in the range of between 5 and 200 nm. In particular, the surface is preferably not a magnetic particle formed completely or partly by a derivative of iron (in particular iron (III) as an iron oxide or hydroxide) with a hydrodynamic diameter in the range of between 5 and 200 nm.

In the sense of the present invention an alloy is referred to as "amorphous" when the atoms do not adhere to any order over medium or long distance (in contrast to crystallised compounds). Glasses are amorphous compounds.

In the sense of the present invention "ceramics" are of crystalline or partially crystalline structure, or of glass, and are formed from substantially inorganic and non-metallic substances by a molten mass that solidifies on cooling or is formed and brought to maturity, at the same time or subsequently, by the action of heat. These can be oxide ceramics (aluminium or zirconium oxides), non-oxide ceramics (carbides, borides, nitrides, ceramics composed of silicon and atoms such as tungsten, magnesium, platinum or also titanium); or finally composite ceramics (combination of oxides and non-oxides such as ruby).

Within the framework of the present invention "molecular functionalisation layer" is understood to be a layer composed of molecules that are each anchored to the substrate by at least one of their terminations and are arranged side by side in an organised manner. The molecules are preferably anchored to the surface by their amine or phosphonic terminations. Their surface organisation and the different chemical groups that they exhibit allow the chemical or physical properties of the surfaces thus coated to be modified. The thickness of the molecular layer obtained using the process that is the subject of the present invention is advantageously in the nanometer range, i.e. ranging between 0.1 nm and 50 nm.

The first step of degreasing the surface is optional and depends on the nature and the appearance of the surface that has to be coated. This degreasing step can be achieved by any classically used method, e.g. by washing the surface with an appropriate detergent. The surface is then advantageously dried to remove any trace of the detergent used.

In the process forming the subject of the present invention the surface to be functionalised is brought into contact with a composition containing phosphonic compounds and a composition containing amine compounds until said compounds self-assemble into a layer that coats said surface (steps b and c).

It is not necessary to perform steps b) and c) in this order in this process, but this embodiment is nevertheless preferred. In this preferred embodiment the surface will be brought into contact firstly with the phosphonic acids and then with the amine. In another preferred process the coating could be performed with two types of compounds at the same time. In this latter case, the coating composition used is, for example, the composition according to the invention described above. In this preferred embodiment the two types of compounds are contained in the same composition and steps b) and c) are then combined in only one step.

Without the intention of limiting hereto, the duration of placement in contact of the composition or compositions containing the two compounds with the surface to be coated is typically 5 seconds to 24 hours, preferably 30 seconds to 1 hour, and even more preferred 1 minute to 20 minutes.

The solvent of the compositions containing the N and/or P compounds is chosen in order to allow solubilisation. This solvent could be chosen in particular from water or alcohol solvents, in particular $C_1$ to $C_6$ alcohols such as methanol, ethanol, isopropanol (IPA), aldehydes, ketones such as acetone, ethers such as diethyl ether or tetrahydrofuran, or alkanes, in particular $C_1$ to $C_8$ alkanes, as well as their mixtures, or also in a solvent composed of hydrotreated naphthas in mixture with IPA or acetone, for example. The mixtures can also be composed of one or more of the aforementioned solvents and water ($H_2O$).

The solvent of the composition containing the phosphonic acid is preferably IPA.

The solvent of the composition containing the amine is preferably an aqueous solution mixed with IPA or IPA on its own.

To recall, the solvent of the composition of the invention (containing both the amine compound and the phosphonic compound) is preferably water in mixture with IPA, e.g. 90% water mixed with 10% IPA.

"Effective quantity" is understood here to mean that the quantity of phosphonic compounds is in the range of between 0.0001 and 20% by weight, preferably between 0.001 and 5% by weight in relation to the total composition containing them, and the content of amine compounds is in the range of between 0.0001 and 20% by weight, preferably between 0.001 and 5% by weight in relation to the total composition containing them.

According to a preferred embodiment the amine or phosphonic compounds are integrated into the compositions containing them in a molar concentration in the range of between $10^{-1}$ and $10^{-15}$ mol/L, preferably in the range of between $10^{-2}$ and $10^{-10}$ mol/L.

If the two N and P compounds are mixed in a single composition, they are preferably in equal quantities (i.e. 50%-50% within the composition), although it is also possible to use different proportions (25%-75% of one or the other).

When the compositions containing the amine and phosphonic compounds are liquid, they can be placed in contact with the surface to be coated, for example, by tempering, spin-coating, wiping, vaporisation, aerosol or by sputtering. When these compositions are gaseous or supercritical they can be placed in contact with the surface to be coated by means of a reactor, which is controllable in pressure and temperature and which allows the injection of a gas such as $CO_2$.

After the step of placing the surface in contact with the coating composition or compositions the removal of this or these (step e) is conducted in order to remove the solvent and all the amine and phosphonic solutes that have not attached securely to the substrate during contact from the surface. This removal of the coating compounds can be performed, for example, by rinsing, or mechanically by dewatering, centrifuging or evaporation. The surface can be additionally rinsed by immersion in an appropriate solvent in order to ensure complete removal of the non-attached solute. Said appropriate solvent is preferably that used to prepare the solution or water.

The surface can be dried (step f) in a hot air flow, e.g. at 70° C. for 2 minutes.

Steps b) to f) of the coating process of the invention can be repeated with one compound or the other or with both compounds (P and N), which can improve coating efficiency.

In a third aspect the present invention also concerns surfaces functionalised by means of the coating process of the invention. These surfaces can be any type of surface and in particular surfaces formed to more than 50%, preferably to more than 75%, further preferred to more than 85% and even to more than 95%:

of metals and oxides chosen from gold (Au), platinum (Pt), palladium (Pd), silver (Ag), rhodium (Rh), copper (Cu), iron (Fe), titanium (Ti), aluminium (Al), chromium (Cr), tantalum (Ta), aluminas, zirconias, ruby (alloy of aluminium oxide and chromium, n° CAS 12174-49-1), sapphire (aluminium oxide, n° CAS 1317-82-4), nickel (Ni), ruthenium (Ru) and tin (Sn), alloys and oxides chosen from steels (alloy of iron and carbon), stainless steel, brass (alloy of copper and zinc), copper-nickel-zinc (alloy), bronze (alloy of copper and tin), tin-nickel (Sn—Ni), nickel-phosphorus (Ni—P), copper-beryllium (Cu—Be), palladium-nickel (Pd—Ni), copper-cobalt (Cu—Co) or alloys containing vanadium (V), chromium (Cr), manganese (Mn), zinc (Zn), tungsten (W), or zirconium (Zr), or an amorphous alloy, or ceramics such as e.g. zirconium oxides (ZrOx), titanium oxide (TiOx) or tantalum oxide (TaxOy), semi-conductors such as silicon (Si) or germanium (Ge) as well as their oxides such as glass (SiOx), or also diamond in any one of its forms, carbide and nitride chosen from the following materials: boron (B), silicon (Si), tungsten (W), chromium (Cr), titanium (Ti), magnesium (Mg), aluminium (Al), substituted or unsubstituted polymers such as e.g. polyamides, polyacrylates, polyacrylamides, polyurethanes, polyureas, polyesters, polyketones, polyimides, polysulphides, polysulphoxides, polysulphones, polythiophenes, polypyridines, polypyrroles, polyethers, silicones, polyamides, polysaccharides, fluoropolymers, amides, imides, polypeptides, polyethylenes, polyoxymethylene (POM), polystyrenes, polypropylenes, polyethylene terephthalates (PET), polyether ether ketones (PEEK), nylons, copolymers of any of these polymers or mixtures thereof.

In a preferred embodiment said functionalised surface is formed to more than 50%, preferably to more than 75% and even more preferred to more than 85%, indeed even to more than 95% of gold, steel, stainless steel, titanium, nickel, glass, rhodium or aluminium.

The composition and process of the present invention are preferably used in the field of epilame coating of timepieces or clock mechanisms.

"Epilame coating" is understood here to mean any method with the aim of preventing the spread of a lubricant over a surface of a micromechanical part.

"Clock mechanism" is understood here to mean, for example, an escapement, a spiral balance, a jumper, a push-button, a wheel train, a pinion, a barrel, a setting stem etc. of a clock movement, this list, of course, being in no way restrictive.

"Timepieces" are understood here to mean, for example, a clock movement as such or integrated into a watch product, typically a wristwatch, a clock, a pendulum clock.

"Device integrated into a watch product" is understood here to mean an escapement, a spiral balance, a jumper, a push-button, a wheel train, a pinion, a barrel, a setting stem etc. of a clock movement, this list, of course, being in no way restrictive.

Thus, in a particular embodiment the surfaces coated by the process of the invention are used in parts used in clock mechanisms or in devices integrated into watch products.

Thus, in a fourth aspect the present invention concerns the use of a surface functionalised by means of the process defined above for the production of clock mechanisms or timepieces.

In a fifth aspect the present invention concerns the use of the composition of the invention or of the coating process of the invention to increase the hydrophobicity and/or lipophobicity of a surface to limit the corrosion of a surface, to limit dirt deposition and/or microbiological contamination on a surface, to lubricate a surface or to promote flows and limit the blockage of small channels on surfaces used in horology, in timepieces or in clock mechanisms.

In particular, this composition and/or this process is/are very suitable for lubricating a metal surface (surface of a metal part or of a part coated with a metal layer), for reducing the coefficient of friction and therefore limiting mechanical wear of pieces thus protected.

Advantageously, the strong bond of the N and P molecules for the coated surfaces can prevent the user or the product in contact with these surfaces from being contaminated by these molecules. The N and P molecules used in mixture have a strong affinity for the materials, including in adverse conditions for the material (e.g. in the presence of detergent, high temperature, acid, base, uv radiation, humidity).

Advantageously, the functionalised surface obtained using the process of the invention is a contact surface of an escapement wheel with the pallet stones of the pallet of a clock escapement device, wherein said surface belongs to the escapement wheel and/or to the pallet stone, as illustrated in FIG. 4.

Advantageously, the functionalised surface obtained using the process of the invention is a contact surface of an arbour and/or of a stone in which said arbour pivots.

EXAMPLES

Example 1: Synthesis of 2-(perfluoro-2,5,8,11-tetramethyl-3,6,9,12-tetraoxapentadecanylamino)-ethylamine Methyl perfluoro-2,5,8,11-tetramethyl-3,6,9,12-tetraoxapentadecanoate (10 g, 11.9 mmol) is added to a solution of ethylenediamine (4 mL, 59.3 mmol) in 20 mL of THF. After stirring for 18 h at ambient temperature the reaction mixture is concentrated under vacuum in a rotary evaporator, then dried in a vane pump. Perfluorinated amine is obtained in the form of a colourless oil. $^1$H and $^{13}$C NMR spectra (CD3OD) carried out on the product are consistent with the expected structure.

Example 2: Treatment of Surfaces with a Mixture of a PFPE Amine Molecule and a PFPE Bisphosphonic Molecule The treated parts are immersed for 5 minutes in the mixture composed of $10^{-3}$ mol/L of each of the molecules in a solvent composed to 90% distilled water and 10% isopropanol. The parts are then removed, then rinsed for 30 seconds in distilled water. These two steps are reproduced a second time, then the parts are dried in a flow of hot air.

The molecules used are the following:

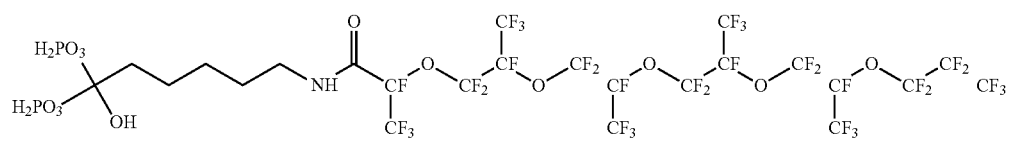

PFPE-BP-08-202

-continued

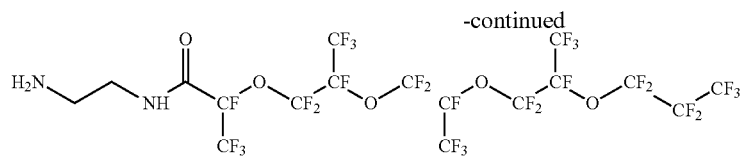

PFPE amine-14-101

At the end of this treatment the contact angles on these parts are measured by depositing a droplet of the following liquids: water, glycerol, diiodomethane.

|  | Steel | | Stainless Steel | | Rhodium | | Nickel | |
| --- | --- | --- | --- | --- | --- | --- | --- | --- |
|  | before treatment | after treatment | before treatment | after treatment | before treatment | after treatment | before treatment | after treatment |
| H2O | 88° | 110° | 47° | 108° | 58° | 103° | 65° | 104° |
| Glycerol | 84° | 103° | 54° | 98° | 57° | 108° | 71° | 98° |
| Diiodomethane | 38° | 96° | 40° | 92° | 44° | 88° | 46° | 89° |

|  | Gold | | Titanium | | Glass | |
| --- | --- | --- | --- | --- | --- | --- |
|  | before treatment | after treatment | before treatment | after treatment | before treatment | after treatment |
| H2O | 99° | 111° | 45° | 104° | 14° | 101° |
| Glycerol | 83° | 104° | 50° | 102° | 12° | 84° |
| Diiodomethane | 34° | 82° | 40° | 90° | 37° | 88° |

The materials were treated effectively by the amine/phosphonic acid mixture in all cases.

Example 3: Treatment of Surfaces Made of Gold with a PFPE Amine Molecule Alone and a PFPE Bisphosphonic Acid Alone Following the same coating protocol as in Example 2, a surface made of gold was coated either with $10^{-3}$ mol/L of a PFPE amine 14-101 or $10^{-3}$ mol/L of a PFPE BP 08-202, or of the mixture of Example 2. The contact angles were measured on the basis of an horological oil (Moebius 941 oil) before deposition, after deposition and after cleaning of the parts with an industrial aqueous detergent.

The molecules used are the same as for Example 2.

| contact angle | Gold | | |
| --- | --- | --- | --- |
| 941 oil | before deposition | after deposition | after washing |
| PFPE-BP | 25° | 66° | 53° |
| PFPE-NH2 | 25° | 42° | 28° |
| Mixture | 25° | 81° | 68° |

This table shows the synergy of the two compounds for the effective coating of materials, for which each molecule alone has only a low affinity.

Example 4: Treatment of Surfaces by Depositing Bisphosphonic and Amine Compounds in Two Stages The parts are treated by immersing for 10 minutes in a solution of $2 \cdot 10^{-3}$ mol/L of PFPE bisphosphonic acid 08-202 in IPA. The parts are then rinsed in reverse osmosis water before being immersed in an aqueous solution of PFPE amine 14-101 ($4 \cdot 10^{-3}$ mol/L) for 5 minutes, then rinsed in reverse osmosis water for 30 seconds. The parts are dried in a flow of hot air.

The molecules used are the same as in Example 2.

At the end of this treatment the contact angles on these parts are measured by depositing a droplet of the following liquids: water, glycerol, diiodomethane, 941 oil.

| before coating | | | |
| --- | --- | --- | --- |
|  | Stainless steel | Gold | Aluminium |
| H2O | 99.4° | 103.7° | 91.5° |
| Glycerol | 84.8° | 82.6° | 88.5° |
| Diiodomethane | 43.9° | 41.5° | 42.4° |
| 941 oil | 28.5° | 23.9° | 21.4° |

| after coating | | | |
| --- | --- | --- | --- |
|  | Stainless steel | Gold | Aluminium |
| H2O | 106.7° | 105.3° | 106.8° |
| Glycerol | 104.9° | 100.3° | 100.3° |
| Diiodomethane | 83.6° | 77.6° | 78.3° |
| 941 oil | 71.0° | 58.3° | 63.5° |

Identical results are obtained for a protocol where the rinsing operations and the immersions of the treated surfaces are conducted wholly in IPA.

Example 5: Modification of the Surface Energy as a Function of the Nature of the N and P Molecules Used Substrates of gold, 316L stainless steel and aluminium were coated using different mixtures of P and N compounds according to the same protocol as that in Example 3. The molecules used are the following:

n-octadecylamine (N-C18), 1-hydroxyhexadecyl-1,1-bisphosphonic acid (BP-C16), PFPE-BP 08-202, PFPE amine-14-101 and PFPE amine-14-102

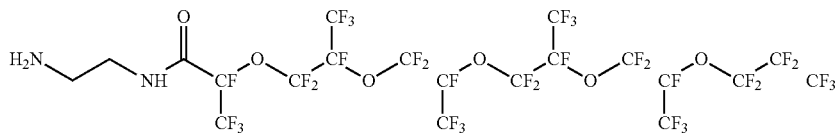

The results are shown in FIGS. 2 and 3.

FIG. 2 shows the contact angles of water droplets placed on substrates (A=gold, B=stainless steel, C=aluminium) as a function of the type of coating used. The dark grey histograms represent the non-coated substrate (reference), the light grey histograms represent the angle after coating with a composition containing:

molecules 08-202 and 14-101 (histograms on the left),
molecules 08-202 and 14-102 (histograms in the middle)
or
molecules BP-C16 and N-C18 (histograms on the right).

FIG. 3 shows the contact angles of droplets of 941 oil placed on substrates (A=gold, B=stainless steel, C=aluminium) as a function of the type of coating used. The dark grey histograms represent the non-coated substrate (reference), the light grey histograms represent the angle after coating with a composition containing:

molecules 08-202 and 14-101 (histograms on the left),
molecules 08-202 and 14-102 (histograms in the middle)
or
molecules BP-C16 and N-C18 (histograms on the right). These graphs show that it is possible to control the hydrophobic and oleophobic characters independently of one another as a result of the invention.

The invention claimed is:

1. A process for coating a surface in a clock mechanism or a device integrated into a watch product with a molecular functionalization layer, the process comprising:
   a) optionally preparing the surface by washing in a solvent and/or in an aqueous detergent, then drying;
   b) contacting the surface with a first composition comprising a phosphonic compound until self-assembly of the phosphonic compound to a layer on the surface;
   c) contacting the surface with a second composition comprising an amine compound until self-assembly of the amine compound to a layer on the surface to form a functionalized surface;
   d) removing supernatant from the functionalized surface;
   e) rinsing the functionalized surface; and
   f) drying the functionalized surface,
   wherein the phosphonic compound and the amine compound are different compounds, and
   wherein the amine compound has the formula (I-N):

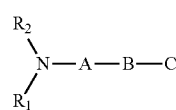

(I-N)

in which:
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—$CH2$-$CH_2$)$_{m'}$, —(O—$CH_2$—CH($CH_3$))$_{m'}$, and —(O—CH($CH_3$)—$CH_2$)$_{m'}$, wherein m' is an integer from 0-100, B is either a) or b):
   a) a single chemical bond, an O atom, an S atom, S(CO), (CO)S, NR or (CO)NR, NR(CO), wherein R is a hydrogen atom or a $C_1$-$C_{10}$ alkyl,
   b) one of the following formulas:

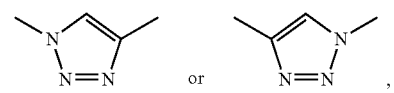

C is selected from the group consisting of a hydrogen atom, $F(CF(CF_3)CF_2O)_n(CF_2)_2CF_3$, $F(CF_2CF(CF_3)O)_n(CF_2)_2CF_3$, $F(CF_2CF_2CF_2O)_n(CF_2)_2CF_3$, and $F(CF_2CF_2O)_n(CF_2)_2CF_3$ and $C_pF_{2p+1}$, in which n and p are integers from 1-100; and $R_1$ and $R_2$ independently of one another represent A-B-C groups as defined above, a hydrogen atom or a linear $C_1$-$C_6$ alkyl short-chain, and/or the phosphonic compound has the formula (I-P):

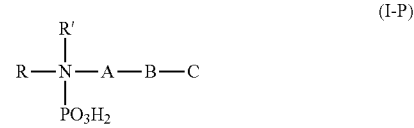

in which:
R is a hydrogen atom H, fluorine atom F or an OH group,
R' is a hydrogen atom H, fluorine atom F or a $PO_3H_2$ group,
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—$CH2$-$CH_2$)$_{m'}$, —(O—$CH_2$—CH($CH_3$))$_{m'}$, and —(O—CH($CH_3$)—$CH_2$)$_{m'}$, wherein m' is an integer from 0-100, B is either a) or b):
   a) a single chemical bond, an O atom, an S atom, S(CO), (CO)S, NZ or (CO)NZ, NZ(CO), wherein Z is a hydrogen atom or a $C_1$-$C_{10}$ alkyl, or
   b) one of the following formulas:

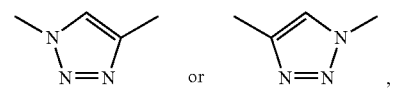

and
C is selected from the group consisting of a hydrogen atom, (CF(CF$_3$)CF$_2$O)$_n$(CF$_2$)$_2$CF$_3$, (CF$_2$CF(CF$_3$)O)$_n$ (CF$_2$)$_2$CF$_3$, (CF$_2$CF$_2$CF$_2$O)$_n$(CF$_2$)$_2$CF$_3$, (CF$_2$CF$_2$O)$_n$ (CF$_2$)CF$_3$ and C$_p$F$_{2p+1}$—, in which n and p are integers from 1-100.

2. The process according to claim 1, wherein b) and c) are carried out in succession.

3. The process according to claim 2, wherein b) is carried out before c).

4. The process according to claim 1, wherein the first composition and the second composition are the same composition and b) and c) are combined.

5. The process according to claim 1, wherein b) to f) are repeated with the first composition, the second composition or both.

6. The process according to claim 1, wherein the surface comprises more than 50% of:
a metal selected from the group consisting of gold (Au), platinum (Pt), palladium (Pd), silver (Ag), rhodium (Rh), copper (Cu), iron (Fe), titanium (Ti), aluminium (Al), chromium (Cr), tantalum (Ta), aluminas, zirconias, ruby, sapphire, nickel (Ni), ruthenium (Ru), tin (Sn), a combination thereof and an oxide thereof,
an alloy selected from the group consisting of steel, stainless steel, brass, copper-nickel-zinc, bronze, tin-nickel (Sn—Ni), nickel-phosphorus (Ni—P), copper-beryllium (Cu—Be), palladium-nickel (Pd—Ni), copper-cobalt (Cu—Co) or a vanadium (V) alloy, chromium (Cr), manganese (Mn), zinc (Zn), tungsten (W), zirconium (Zr), an amorphous alloy, a combination thereof and an oxide thereof, zirconium oxide (ZrOx), titanium oxide (TiOx), tantalum oxide (TaxOy), and a combination thereof,
a semi-conductor selected from the group consisting of silicon (Si), germanium (Ge), and an oxide thereof, diamond in any form, and a combination thereof, and
a carbide, a nitride of or both of a material selected from the group consisting of boron (B), silicon (Si), tungsten (W), chromium (Cr), titanium (Ti), magnesium (Mg), aluminium (Al) and a combination thereof, and
a substituted or unsubstituted polymer selected from the group consisting of polyamide, polyacrylate, polyacrylamide, polyurethane, polyurea, polyester, polyketone, polyimide, polysulphide, polysulphoxide, polysulphone, polythiophene, polypyridine, polypyrrole, polyether, silicone, polyamide, polysaccharide, fluoropolymer, amide, imides, polypeptide, polyethylene, polyoxymethylene (POM), polystyrene, polypropylene, polyethylene terephthalate (PET), polyether ether ketone (PEEK), nylon, a copolymer thereof and a mixture thereof.

7. The process according to claim 1, wherein m is an integer from 0-30.

8. The process according to claim 1, wherein m' is an integer from 0-50.

9. The process according to claim 1, wherein n and p are integers from 1-50.

10. The process according to claim 1, wherein the phosphonic compound and the amine compound are dissolved in a solvent selected from the group consisting of water, an alcohol, an aldehyde, a ketone, an ether, an alkane, a hydrotreated naphtha mixed with IPA or acetone, and a combination thereof.

11. A process for coating a surface in a clock mechanism or a device integrated into a watch product with a molecular functionalization layer, the process comprising:

a) optionally preparing the surface by washing in a solvent and/or in an aqueous detergent, then drying;
b) contacting the surface with a first composition comprising a phosphonic compound until self-assembly of the phosphonic compound to a layer on the surface;
c) contacting the surface with a second composition comprising an amine compound until self-assembly of the amine compound to a layer on the surface to form a functionalized surface;
d) removing supernatant from the functionalized surface;
e) rinsing the functionalized surface; and
f) drying the functionalized surface,
wherein the phosphonic compound and the amine compound are different compounds, and
wherein the amine compound is a perfluoropolyether amine of the formula (I'-N):

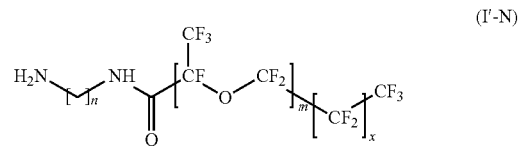

in which n is an integer f from 1-100, m is an integer 0-100 and x is an integer from 0-10,
and/or the phosphonic compound is a perfluorinated bis-phosphonic acid of the formula (I'-P):

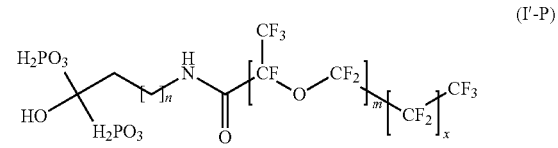

in which n is an integer from 1-100, m is an integer from 0-100 and x is an integer from 0-10.

12. A process for coating a surface in a clock mechanism or a device integrated into a watch product with a molecular functionalization layer, the process comprising:

a) optionally preparing the surface by washing in a solvent and/or in an aqueous detergent, then drying;
b) contacting the surface with a first composition comprising a phosphonic compound until self-assembly of the phosphonic compound to a layer on the surface;
c) contacting the surface with a second composition comprising an amine compound until self-assembly of the amine compound to a layer on the surface to form a functionalized surface;
d) removing supernatant from the functionalized surface;
e) rinsing the functionalized surface; and
f) drying the functionalized surface,
wherein the phosphonic compound and the amine compound are different compounds, and
wherein the amine compound is an amine compound that is a linear alkyl amine of the formula (I"-N):

in which n is an integer from 1-100, and/or the phosphonic compound is a phosphonic compound of one of the formulas (I"-P) and (I'''-P):

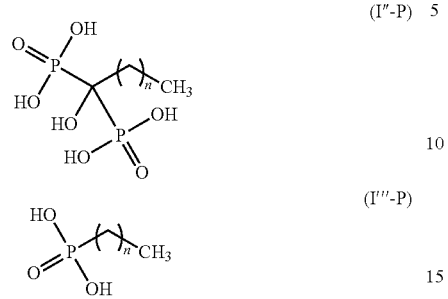

in which n is an integer from 1-100.

13. The process according to claim 12, wherein n is an integer from 5-30.

14. The process according to claim 13, wherein n is an integer from 8-20.

15. A process for increasing the hydrophobicity and/or lipophobicity of a surface in a clock mechanism or in a device integrated into a watch product, the process comprising:
a) optionally preparing the surface by washing in a solvent and/or in an aqueous detergent, then drying;
b) contacting the surface with a first composition comprising a phosphonic compound until self-assembly of the phosphonic compound to a layer on the surface;
c) contacting the surface with a second composition comprising an amine compound until self-assembly of the amine compound to a layer on the surface to form a functionalized surface;
d) removing supernatant from the functionalized surface;
e) rinsing the functionalized surface; and
f) drying the functionalized surface,
wherein the phosphonic compound and the amine compound are different compounds, and
wherein the amine compound has the formula (I-N):

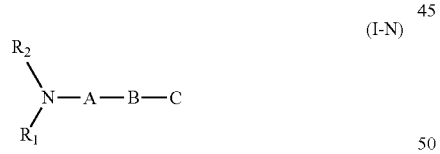

in which:
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—$CH_2$—$CH_2$)$_{m'}$, —(O—$CH_2$—CH($CH_3$))$_{m'}$, and —(O—CH($CH_3$)—$CH_2$)$_{m'}$, wherein m' is an integer from 0-100,
B is either a) or b):
a) a single chemical bond, an O atom, an S atom, S(CO), (CO)S, NR or (CO)NR, NR(CO), wherein R is a hydrogen atom or a $C_1$-$C_{10}$ alkyl,
b) one of the following formulas:

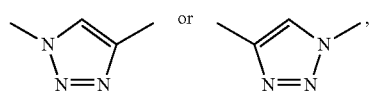

C is selected from the group consisting of a hydrogen atom, $F(CF(CF_3)CF_2O)_n(CF_2)_2CF_3$, $F(CF_2CF(CF_3)O)_n(CF_2)_2CF_3$, $F(CF_2CF_2CF_2O)_n(CF_2)_2CF_3$, and $F(CF_2CF_2O)_n(CF_2)_2CF_3$ and $C_pF_{2p+1}$, in which n and p are integers from 1-100; and
$R_1$ and $R_2$ independently of one another represent A-B-C groups as defined above, a hydrogen atom or a linear $C_1$-$C_6$ alkyl short-chain;
and/or the phosphonic compound has the formula (I-P):

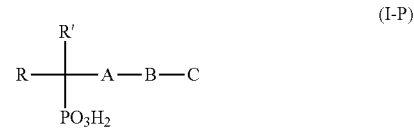

in which:
R is a hydrogen atom H, fluorine atom F or an OH group,
R' is a hydrogen atom H, fluorine atom F or a $PO_3H_2$ group,
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—$CH_2$—$CH_2$)$_{m'}$, —(O—$CH_2$—CH($CH_3$))$_{m'}$, and —(O—CH($CH_3$)—$CH_2$)$_{m'}$, wherein m' is an integer from 0-100,
B is either a) or b):
a) a single chemical bond, an O atom, an S atom, S(CO), (CO)S, NZ or (CO)NZ, NZ(CO), wherein Z is a hydrogen atom or a $C_1$-$C_{10}$ alkyl, or
b) one of the following formulas:

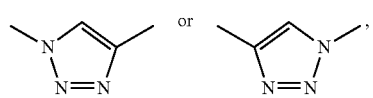

and
C is selected from the group consisting of a hydrogen atom, $(CF(CF_3)CF_2O)_n(CF_2)_2CF_3$, $(CF_2CF(CF_3)O)_n(CF_2)_2CF_3$, $(CF_2CF_2CF_2O)_n(CF_2)_2CF_3$, $(CF_2CF_2O)_n(CF_2)CF_3$ and $C_pF_{2p+1}$—, in which n and p are integers from 1-100.

16. The process according to claim 15, wherein the first composition and the second composition are applied in a sequential manner or simultaneously.

17. The process according to claim 15, wherein the surface comprises more than 50% of:
a metal selected from the group consisting of gold (Au), platinum (Pt), palladium (Pd), silver (Ag), rhodium (Rh), copper (Cu), iron (Fe), titanium (Ti), aluminium (Al), chromium (Cr), tantalum (Ta), aluminas, zirconias, ruby, sapphire, nickel (Ni), ruthenium (Ru), tin (Sn), a combination thereof and an oxide thereof, an alloy selected from the group consisting of steel, stainless steel, brass, copper-nickel-zinc, bronze, tin-nickel (Sn—Ni), nickel-phosphorus (Ni—P), copper-beryllium (Cu—Be), palladium-nickel (Pd—Ni), copper-cobalt (Cu—Co) or a vanadium (V) alloy, chromium (Cr), manganese (Mn), zinc (Zn), tungsten (W), zirconium (Zr), an amorphous alloy, a combination thereof and an oxide thereof, zirconium oxide (ZrOx), titanium oxide (TiOx), tantalum oxide (TaxOy) and a combination thereof, a semi-conductor selected from the group consisting of silicon (Si), germanium (Ge), and an oxide thereof, diamond in any form, and a combination thereof, and a carbide, a nitride of or both of a material selected from the group consisting of boron (B), silicon (Si), tungsten (W), chromium (Cr), titanium (Ti), magnesium (Mg), aluminium (Al) and a combination thereof, and a substituted or unsubstituted polymer selected from the group consisting of polyamide, polyacrylate, polyacrylamide, polyurethane, polyurea, polyester, polyketone, polyimide, polysulphide, polysulphoxide, polysulphone, polythiophene, polypyridine, polypyrrole, polyether, silicone, polyamide, polysaccharide, fluoropolymer, amide, imides, polypeptide, polyethylene, polyoxymethylene (POM), polystyrene, polypropylene, polyethylene terephthalate (PET), polyether ether ketone (PEEK), nylon, a copolymer thereof and a mixture thereof.

18. A process for limiting the corrosion of a surface in a clock mechanism or in a device integrated into a watch product, the process comprising:
  a) optionally preparing the surface by washing in a solvent and/or in an aqueous detergent, then drying;
  b) contacting the surface with a first composition comprising a phosphonic compound until self-assembly of the phosphonic compound to a layer on the surface;
  c) contacting the surface with a second composition comprising an amine compound until self-assembly of the amine compound to a layer on the surface to form a functionalized surface;
  d) removing supernatant from the functionalized surface;
  e) rinsing the functionalized surface; and
  f) drying the functionalized surface,
  wherein the phosphonic compound and the amine compound are different compounds, and
  wherein the amine compound has the formula (I-N):

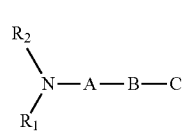

(I-N)

in which:
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—CH2-$CH_2$)$_{m'}$, —(O—$CH_2$—CH($CH_3$))$_{m'}$, and —(O—CH($CH_3$)—$CH_2$)$_{m'}$, wherein m' is an integer from 0-100, B is either a) or b):
  a) a single chemical bond, an O atom, an S atom, S(CO), (CO)S, NR or (CO)NR, NR(CO), wherein R is a hydrogen atom or a $C_1$-$C_{10}$ alkyl,
  b) one of the following formulas:

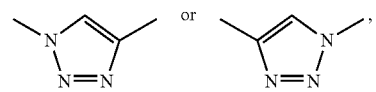

C is selected from the group consisting of a hydrogen atom, $F(CF(CF_3)CF_2O)_n(CF_2)_2CF_3$, $F(CF_2CF(CF_3)O)_n(CF_2)_2CF_3$, $F(CF_2CF_2CF_2O)_n(CF_2)_2CF_3$, and $F(CF_2CF_2O)_n(CF_2)_2CF_3$ and $C_pF_{2p+1}$, in which n and p are integers from 1-100; and $R_1$ and $R_2$ independently of one another represent A-B-C groups as defined above, a hydrogen atom or a linear $C_1$-$C_6$ alkyl short-chain;

and/or the phosphonic compound has the formula (I-P):

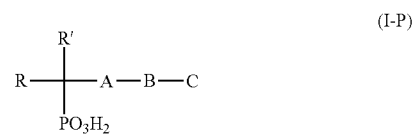

(I-P)

in which:
R is a hydrogen atom H, fluorine atom F or an OH group,
R' is a hydrogen atom H, fluorine atom F or a $PO_3H_2$ group,
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated, X is selected from the group consisting of a single covalent bond, —(O—$CH_2$—$CH_2$)$_{m'}$, —(O—$CH_2$—CH2-$CH_2$)$_{m'}$, —(O—$CH_2$—CH($CH_3$))$_{m'}$, and —(O—CH($CH_3$)—$CH_2$)$_{m'}$, wherein m' is an integer from 0-100, B is either a) or b):
  a) a single chemical bond, an O atom, an S atom, S(CO), (CO)S, NZ or (CO)NZ, NZ(CO), wherein Z is a hydrogen atom or a $C_1$-$C_{10}$ alkyl, or
  b) one of the following formulas:

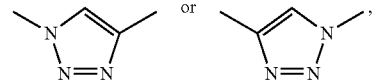

and

C is selected from the group consisting of a hydrogen atom, $(CF(CF_3)CF_2O)_n(CF_2)_2CF_3$, $(CF_2CF(CF_3)O)_n(CF_2)_2CF_3$, $(CF_2CF_2CF_2O)_n(CF_2)_2CF_3$, $(CF_2CF_2O)_n(CF_2)CF_3$ and $C_pF_{2p+1}$—, in which n and p are integers from 1-100.

19. A process for limiting dirt deposition on a surface in a clock mechanism or in a device integrated into a watch product, the process comprising:
  a) optionally preparing the surface by washing in a solvent and/or in an aqueous detergent, then drying;

b) contacting the surface with a first composition comprising a phosphonic compound until self-assembly of the phosphonic compound to a layer on the surface;
c) contacting the surface with a second composition comprising an amine compound until self-assembly of the amine compound to a layer on the surface to form a functionalized surface;
d) removing supernatant from the functionalized surface;
e) rinsing the functionalized surface; and
f) drying the functionalized surface,
wherein the phosphonic compound and the amine compound are different compounds, and
wherein the amine compound has the formula (I-N):

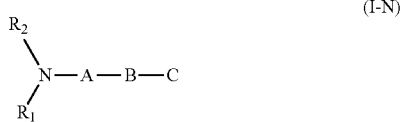

in which:
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—$CH2$-$CH_2$)$_{m'}$, —(O—$CH_2$—$CH(CH_3)$)$_{m'}$ and —(O—CH($CH_3$)—$CH_2$)$_{m'}$, wherein m' is an integer from 0-100,
B is either a) or b):
  a) a single chemical bond, an O atom, an S atom, S(CO), (CO)S, NR or (CO)NR, NR(CO), wherein R is a hydrogen atom or a $C_1$-$C_{10}$ alkyl,
  b) one of the following formulas:

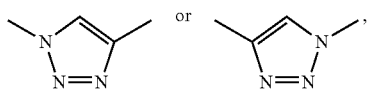

C is selected from the group consisting of a hydrogen atom, F(CF(CF$_3$)CF$_2$O)$_n$(CF$_2$)$_2$CF$_3$, F(CF$_2$CF(CF$_3$)O)$_n$(CF$_2$)$_2$CF$_3$, F(CF$_2$CF$_2$CF$_2$O)$_n$(CF$_2$)$_2$CF$_3$, and F(CF$_2$CF$_2$O)$_n$(CF$_2$)$_2$CF$_3$ and $C_pF_{2p+1}$, in which n and p are integers from 1-100; and
$R_1$ and $R_2$ independently of one another represent A-B-C groups as defined above, a hydrogen atom or a linear $C_1$-$C_6$ alkyl short-chain;
and/or the phosphonic compound has the formula (I-P):

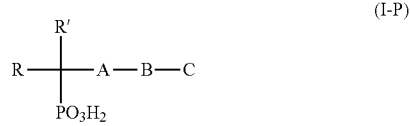

in which:
R is a hydrogen atom H, fluorine atom F or an OH group,
R' is a hydrogen atom H, fluorine atom F or a PO$_3$H$_2$ group, A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—$CH2$-$CH_2$)$_{m'}$, —(O—$CH_2$—$CH(CH_3)$)$_{m'}$ and —(O—CH($CH_3$)—$CH_2$)$_{m'}$, wherein m' is an integer from 0-100,
B is either a) or b):
  a) a single chemical bond, an O atom, an S atom, S(CO), (CO)S, NZ or (CO)NZ, NZ(CO), wherein Z is a hydrogen atom or a $C_1$-$C_{10}$ alkyl, or
  b) one of the following formulas:

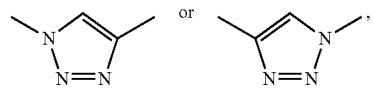

and
C is selected from the group consisting of a hydrogen atom, (CF(CF$_3$)CF$_2$O)$_n$(CF$_2$)$_2$CF$_3$, (CF$_2$CF(CF$_3$)O)$_n$(CF$_2$)$_2$CF$_3$, (CF$_2$CF$_2$CF$_2$O)$_n$(CF$_2$)$_2$CF$_3$, (CF$_2$CF$_2$O)$_n$(CF$_2$)CF$_3$ and $C_pF_{2p+1}$—, in which n and p are integers from 1-100.

20. A process for limiting microbiological contamination on a surface in a clock mechanism or in a device integrated into a watch product, the process comprising:
a) optionally preparing the surface by washing in a solvent and/or in an aqueous detergent, then drying;
b) contacting the surface with a first composition comprising a phosphonic compound until self-assembly of the phosphonic compound to a layer on the surface;
c) contacting the surface with a second composition comprising an amine compound until self-assembly of the amine compound to a layer on the surface to form a functionalized surface;
d) removing supernatant from the functionalized surface;
e) rinsing the functionalized surface; and
f) drying the functionalized surface,
wherein the phosphonic compound and the amine compound are different compounds, and
wherein the amine compound has the formula (I-N):

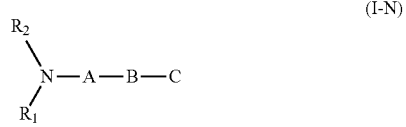

in which:
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—$CH2$-$CH_2$)$_{m'}$, —(O—$CH_2$—$CH(CH_3)$)$_{m'}$ and —(O—CH($CH_3$)—$CH_2$)$_{m'}$, wherein m' is an integer from 0-100, B is either a) or b):
 a) a single chemical bond, an O atom, an S atom, S(CO), (CO)S, NR or (CO)NR, NR(CO), wherein R is a hydrogen atom or a $C_1$-$C_{10}$ alkyl,
 b) one of the following formulas:

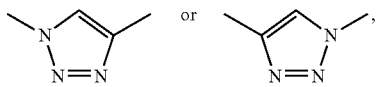

C is selected from the group consisting of a hydrogen atom, $F(CF(CF_3)CF_2O)_n(CF_2)_2CF_3$, $F(CF_2CF(CF_3)O)_n(CF_2)CF_3$, $F(CF_2CF_2CF_2O)_n(CF_2)CF_3$, and $F(CF_2CF_2O)_n(CF_2)_2CF_3$ and $C_pF_{2p+1}$, in which n and p are integers from 1-100; and $R_1$ and $R_2$ independently of one another represent A-B-C groups as defined above, a hydrogen atom or a linear $C_1$-$C_6$ alkyl short-chain;

and/or the phosphonic compound has the formula (I-P):

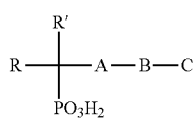

in which:
R is a hydrogen atom H, fluorine atom F or an OH group,
R' is a hydrogen atom H, fluorine atom F or a $PO_3H_2$ group,
A is a $(CH)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated, X is selected from the group consisting of a single covalent bond, —(O—CH_2—CH_2)_{m'}, —(O—CH_2—CH2-CH_2)_{m'}, —(O—CH_2—CH(CH_3))_{m'}, and —(O—CH(CH_3)—CH_2)_{m'}, wherein m' is an integer from 0-100,
B is either a) or b):
 a) a single chemical bond, an O atom, an S atom, S(CO), (CO)S, NZ or (CO)NZ, NZ(CO), wherein Z is a hydrogen atom or a $C_1$-$C_{10}$ alkyl, or
 b) one of the following formulas:

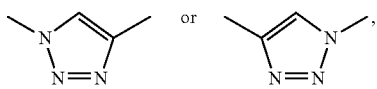

and
C is selected from the group consisting of a hydrogen atom, $(CF(CF_3)CF_2O)_n(CF_2)_2CF_3$, $(CF_2CF(CF_3)O)_n(CF_2)_2CF_3$, $(CF_2CF_2CF_2O)_n(CF_2)_2CF_3$, $(CF_2CF_2O)_n(CF_2)CF_3$ and $C_pF_{2p+1}$—, in which n and p are integers from 1-100.

21. A process for lubricating a surface in a clock mechanism or in a device integrated into a watch product, the process comprising:
 a) optionally preparing the surface by washing in a solvent and/or in an aqueous detergent, then drying;
 b) contacting the surface with a first composition comprising a phosphonic compound until self-assembly of the phosphonic compound to a layer on the surface;
 c) contacting the surface with a second composition comprising an amine compound until self-assembly of the amine compound to a layer on the surface to form a functionalized surface;
 d) removing supernatant from the functionalized surface;
 e) rinsing the functionalized surface; and
 f) drying the functionalized surface,
wherein the phosphonic compound and the amine compound are different compounds, and
wherein the amine compound has the formula (I-N):

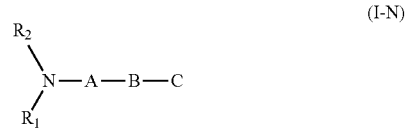

in which:
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—CH_2—CH_2)_{m'}, —(O—CH_2—CH2-CH_2)_{m'}, —(O—CH_2—CH(CH_3))_{m'}, and —(O—CH(CH_3)—CH_2)_{m'}, wherein m' is an integer from 0-100,
B is either a) or b):
 a) a single chemical bond, an O atom, an S atom, S(CO), (CO)S, NR or (CO)NR, NR(CO), wherein R is a hydrogen atom or a $C_1$-$C_{10}$ alkyl,
 b) one of the following formulas:

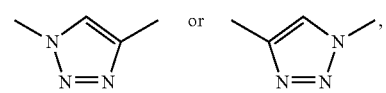

C is selected from the group consisting of a hydrogen atom, $F(CF(CF_3)CF_2O)_n(CF_2)_2CF_3$, $F(CF_2CF(CF_3)O)_n(CF_2)_2CF_3$, $F(CF_2CF_2CF_2O)_n(CF_2)_2CF_3$, and $F(CF_2CF_2O)_n(CF_2)_2CF_3$ and $C_pF_{2p+1}$, in which n and p are integers from 1-100; and $R_1$ and $R_2$ independently of one another represent A-B-C groups as defined above, a hydrogen atom or a linear $C_1$-$C_6$ alkyl short-chain;

and/or the phosphonic compound has the formula (I-P):

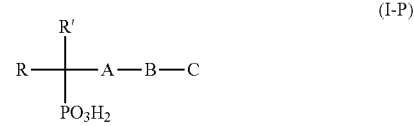

in which:
R is a hydrogen atom H, fluorine atom F or an OH group,
R' is a hydrogen atom H, fluorine atom F or a $PO_3H_2$ group, A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2)_{m'}$—, —(O—$CH_2$—CH2-$CH_2)_{m'}$—, —(O—$CH_2$—$CH(CH_3))_{m'}$—, and —(O—CH$(CH_3)$—$CH_2)_{m'}$—, wherein m' is an integer from 0-100, B is either a) or b):
  a) a single chemical bond, an O atom, an S atom, S(CO), (CO)S, NZ or (CO)NZ, NZ(CO), wherein Z is a hydrogen atom or a $C_1$-$C_{10}$ alkyl, or
  b) one of the following formulas:

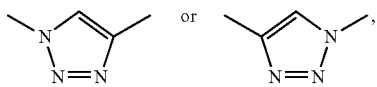

and
  C is selected from the group consisting of a hydrogen atom, $(CF(CF_3)CF_2O)_n(CF_2)_2CF_3$, $(CF_2CF(CF_2)O)_n(CF_2)_2CF_3$, $(CF_2CF_2CF_2O)_n(CF_2)_2CF_3$, $(CF_2CF_2O)_n(CF_2)CF_3$ and $C_pF_{2p+1}$—, in which n and p are integers from 1-100.

22. A process for promoting flows on a surface in a clock mechanism or in a device integrated into a watch product, the process comprising:
  a) optionally preparing the surface by washing in a solvent and/or in an aqueous detergent, then drying;
  b) contacting the surface with a first composition comprising a phosphonic compound until self-assembly of the phosphonic compound to a layer on the surface;
  c) contacting the surface with a second composition comprising an amine compound until self-assembly of the amine compound to a layer on the surface to form a functionalized surface;
  d) removing supernatant from the functionalized surface;
  e) rinsing the functionalized surface; and
  f) drying the functionalized surface,
wherein the phosphonic compound and the amine compound are different compounds, and
wherein the amine compound has the formula (I-N):

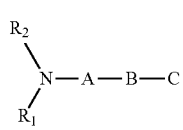

(I-N)

in which:
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2)_{m'}$—, —(O—$CH_2$—CH2-$CH_2)_{m'}$—, —(O—$CH_2$—$CH(CH_3))_{m'}$— and —(O—CH$(CH_3)$—$CH_2)_{m'}$—, wherein m' is an integer from 0-100,
B is either a) or b):
  a) a single chemical bond, an O atom, an S atom, S(CO), (CO)S, NR or (CO)NR, NR(CO), wherein R is a hydrogen atom or a $C_1$-$C_{10}$ alkyl,
  b) one of the following formulas:

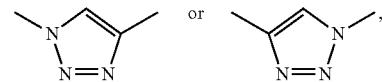

C is selected from the group consisting of a hydrogen atom, $F(CF(CF_3)CF_2O)_n(CF_2)_2CF_3$, $F(CF_2CF(CF_3)O)_n(CF_2)_2CF_3$, $F(CF_2CF_2CF_2O)_n(CF_2)_2CF_3$, and $F(CF_2CF_2O)_n(CF_2)_2CF_3$ and $C_pF_{2p+1}$, in which n and p are integers from 1-100; and
$R_1$ and $R_2$ independently of one another represent A-B-C groups as defined above, a hydrogen atom or a linear $C_1$-$C_6$ alkyl short-chain;
and/or the phosphonic compound has the formula (I-P):

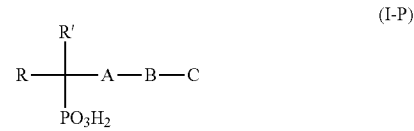

(I-P)

in which:
R is a hydrogen atom H, fluorine atom F or an OH group,
R' is a hydrogen atom H, fluorine atom F or a $PO_3H_2$ group,
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated, X is selected from the group consisting of a single covalent bond, —(O—$CH_2$—$CH_2)_{m'}$—, —(O—$CH_2$—CH2-$CH_2)_{m'}$—, —(O—$CH_2$—$CH(CH_3))_{m'}$—, and —(O—CH$(CH_3)$—$CH_2)_{m'}$—, wherein m' is an integer from 0-100,
B is either a) or b):
  a) a single chemical bond, an O atom, an S atom, S(CO), (CO)S, NZ or (CO)NZ, NZ(CO), wherein Z is a hydrogen atom or a $C_1$-$C_{10}$ alkyl, or
  b) one of the following formulas:

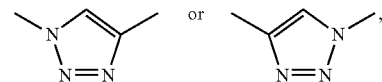

and
C is selected from the group consisting of a hydrogen atom, $(CF(CF_3)CF_2O)_n(CF_2)_2CF_3$, $(CF_2CF(CF_3)O)_n(CF_2)_2CF_3$, $(CF_2CF_2CF_2O)_n(CF_2)_2CF_3$, $(CF_2CF_2O)_n(CF_2)CF_3$ and $C_pF_{2p+1}$—, in which n and p are integers from 1-100.

23. A process for confining a lubricant in a predefined zone of a surface in a clock mechanism or in a device integrated into a watch product, the process comprising:
  a) optionally preparing the surface by washing in a solvent and/or in an aqueous detergent, then drying;
  b) contacting the surface with a first composition comprising a phosphonic compound until self-assembly of the phosphonic compound to a layer on the surface;

c) contacting the surface with a second composition comprising an amine compound until self-assembly of the amine compound to a layer on the surface to form a functionalized surface;
d) removing supernatant from the functionalized surface;
e) rinsing the functionalized surface; and
f) drying the functionalized surface,
wherein the phosphonic compound and the amine compound are different compounds, and
wherein the amine compound has the formula (I-N):

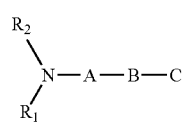

(I-N)

in which:
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated; X is selected from the group consisting of a single covalent bond, —(O—$CH_2$—$CH_2$)$_{m'}$, —(O—$CH_2$—CH2-$CH_2$)$_{m'}$, —(O—$CH_2$—CH($CH_3$))$_{m'}$ and —(O—CH($CH_3$)—$CH_2$)$_{m'}$, wherein m' is an integer from 0-100,
B is either a) or b):
  a) a single chemical bond, an O atom, an S atom, S(CO), (CO)S, NR or (CO)NR, NR(CO), wherein R is a hydrogen atom or a $C_1$-$C_{10}$ alkyl,
  b) one of the following formulas:

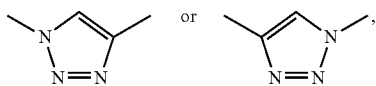

C is selected from the group consisting of a hydrogen atom, $F(CF(CF_3)CF_2O)_n(CF_2)_2CF_3$, $F(CF_2CF(CF_3)O)_n(CF_2)_2CF_3$, $F(CF_2CF_2CF_2O)_n(CF_2)_2CF_3$, and $F(CF_2CF_2O)_n(CF_2)_2CF_3$ and $C_pF_{2p+1}$, in which n and p are integers from 1-100; and $R_1$ and $R_2$ independently of one another represent A-B-C groups as defined above, a hydrogen atom or a linear $C_1$-$C_6$ alkyl short-chain;
and/or the phosphonic compound has the formula (I-P):

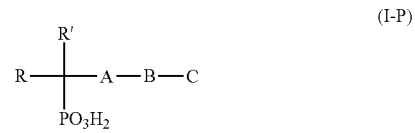

(I-P)

in which:
R is a hydrogen atom H, fluorine atom F or an OH group,
R' is a hydrogen atom H, fluorine atom F or a $PO_3H_2$ group,
A is a $(CH_2)_m$—X— group, wherein m is an integer from 0-100, and X is a $C_0$-$C_{100}$ alkyl group that is saturated or unsaturated, perfluorinated or partially fluorinated, wherein the alkyl chain is unsubstituted or substituted with at least one 0 to 10 cycloalkyl or at least one aryl group that is perfluorinated or unperfluorinated, X is selected from the group consisting of a single covalent bond, —(O—$CH_2$—$CH_2$)$_{m'}$, —(O—$CH_2$—CH2-$CH_2$)$_{m'}$, —(O—$CH_2$—CH($CH_3$))$_{m'}$, and —(O—CH($CH_3$)—$CH_2$)$_{m'}$, wherein m' is an integer from 0-100,
B is either a) or b):
  a) a single chemical bond, an O atom, an S atom, S(CO), (CO)S, NZ or (CO)NZ, NZ(CO), wherein Z is a hydrogen atom or a $C_1$-$C_{10}$ alkyl, or
  b) one of the following formulas:

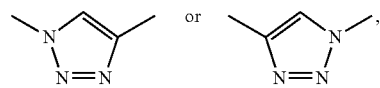

C is selected from the group consisting of a hydrogen atom, $(CF(CF_3)CF_2O)_n(CF_2)_2CF_3$, $(CF_2CF(CF_3)O)_n(CF_2)_2CF_3$, $(CF_2CF_2CF_2O)_n(CF_2)_2CF_3$, $(CF_2CF_2O)_n(CF_2)CF_3$ and $C_pF_{2p+1}$—, in which n and p are integers from 1-100.

* * * * *

UNITED STATES PATENT AND TRADEMARK OFFICE
CERTIFICATE OF CORRECTION

PATENT NO. : 9,971,306 B2
APPLICATION NO. : 14/399616
DATED : May 15, 2018
INVENTOR(S) : David Portet et al.

It is certified that error appears in the above-identified patent and that said Letters Patent is hereby corrected as shown below:

In the Specification

Column 5, Line 54, "0" should read -- "O" --;

In the Claims

Column 18, Lines 36-40, Claim 1:

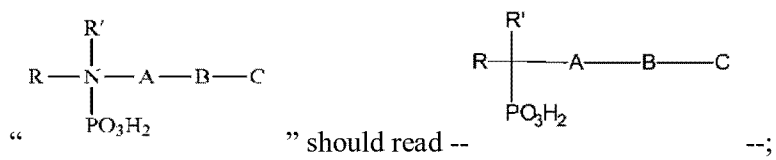

Column 27, Line 15, Claim 20:
"C is selected from the group consisting of a hydrogen atom, $F(CF(CF_3)CF_2O)_n(CF_2)_2CF_3$, $F(CF_2CF(CF_3)O)_n(CF_2)CF_3$, $F(CF_2CF_2CF_2O)_n(CF_2)CF_3$," should read -- C is selected from the group consisting of a hydrogen atom, $F(CF(CF_3)CF_2O)_n(CF_2)_2CF_3$, $F(CF_2CF(CF_3)O)_n(CF_2)_2CF_3$, $F(CF_2CF_2CF_2O)_n(CF_2)_2CF_3$, --;

Column 27, Line 35, Claim 20:
"A is a $(CH)_m-X-$ group," should read -- A is a $(CH_2)_m-X-$ group, --;

Column 29, Line 26, Claim 21:
"C is selected from the group consisting of a hydrogen atom, $(CF(CF_3)CF_2O)_n(CF_2)_2CF_3$, $(CF_2CF(CF_2)O)_n(CF_2)_2CF_3$, $(CF_2CF_2CF_2O)_n(CF_2)_2CF_3$," should read -- C is selected from the group consisting of a hydrogen atom, $(CF(CF_3)CF_2O)_n(CF_2)_2CF_3$, $(CF_2CF(CF_3)O)_n(CF_2)_2CF_3$, $(CF_2CF_2CF_2O)_n(CF_2)_2CF_3$, --;

Signed and Sealed this
Fifth Day of May, 2020

Andrei Iancu
*Director of the United States Patent and Trademark Office*

CERTIFICATE OF CORRECTION (continued)
U.S. Pat. No. 9,971,306 B2

Column 31, Line 29, Claim 23:
"(O-CH$_2$-CH$_2$)$_{m'}$, -(O-CH$_2$-CH2-CH$_2$)$_{m'}$, -(O-CH$_2$-CH(CH$_3$)$_{m'}$ and -(O -CH(CH$_3$)-CH$_2$)$_{m'}$, wherein m' is an integer from 0-100," should read -- (O-CH$_2$-CH$_2$)$_{m'}$, -(O-CH$_2$-CH2-CH$_2$)$_{m'}$, -(O-CH$_2$-CH(CH$_3$))$_{m'}$ and -(O -CH(CH$_3$)-CH$_2$)$_{m'}$, wherein m' is an integer from 0-100, --;

Column 32, Line 39, Claim 23:

" 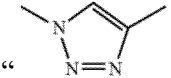 or  " should read --  or  and --.